(12) United States Patent
Horiba et al.

(10) Patent No.: US 8,627,802 B2
(45) Date of Patent: Jan. 14, 2014

(54) EVAPORATED FUEL TREATMENT APPARATUS AND METHOD OF DETECTING FAILURE IN CONTROL VALVE

(75) Inventors: Ayumu Horiba, Saitama (JP); Masakazu Kitamoto, Saitama (JP); Koichi Hidano, Saitama (JP); Junji Saiga, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 462 days.

(21) Appl. No.: 13/029,405

(22) Filed: Feb. 17, 2011

(65) Prior Publication Data

US 2011/0203554 A1    Aug. 25, 2011

(30) Foreign Application Priority Data

Feb. 19, 2010  (JP) ................. 2010-035088
Feb. 19, 2010  (JP) ................. 2010-035136
Feb. 19, 2010  (JP) ................. 2010-035137

(51) Int. Cl.
    *F02M 33/02*    (2006.01)
(52) U.S. Cl.
    USPC ..................... 123/520; 251/315.01
(58) Field of Classification Search
    USPC ............... 123/518–520; 251/315.01
    See application file for complete search history.

(56) References Cited

U.S. PATENT DOCUMENTS

| | | | |
|---|---|---|---|
| 5,636,617 A | 6/1997 | Nakatsu | |
| 5,778,859 A | 7/1998 | Takagi | |
| 5,954,034 A | 9/1999 | Takagi | |
| 6,698,280 B1 | 3/2004 | Iden et al. | |
| 6,829,921 B2 | 12/2004 | Isobe et al. | |
| 8,095,292 B2 | 1/2012 | Mclain et al. | |
| 8,104,453 B2 | 1/2012 | Kobayashi | |
| 2001/0010219 A1 | 8/2001 | Isobe et al. | |
| 2010/0327205 A1* | 12/2010 | Tan | 251/315.01 |

FOREIGN PATENT DOCUMENTS

| | | |
|---|---|---|
| CN | 2410511 Y | 12/2000 |
| CN | 201155608 Y | 11/2008 |
| CN | 101892917 A | 11/2010 |
| JP | 61-228172 A | 10/1986 |

(Continued)

OTHER PUBLICATIONS

JP Office Acton dated Nov. 19, 2013 in the Japanese Application 2010-035136.

(Continued)

*Primary Examiner* — Thomas Moulis
(74) *Attorney, Agent, or Firm* — Carrier Blackman & Associates, P.C.; Joseph P. Carrier; William D. Blackman

(57) ABSTRACT

An evaporated fuel treatment apparatus including a canister for adsorbing an evaporated fuel in a fuel tank, a control valve at a vapor path communicating with a fuel tank and a canister, has a dead-zone range where a flow of the evaporated fuel is blocked even if an opening angle of the control valve is increased in an open direction from zero opening angle, and allows the evaporated fuel to flow through over the dead-zone range. The control unit increases the opening angle from substantially zero to a predetermined angle in the dead-zone range and stands by prior to the opening control, and increases the opening angle from the predetermined angle upon the opening control. An output value by control unit set in the dead-zone range is compared with a detected value to detect a failure of the control valve.

5 Claims, 10 Drawing Sheets

(56) References Cited

FOREIGN PATENT DOCUMENTS

| JP | 06-185420 A | 7/1994 |
|---|---|---|
| JP | 8-028368 A | 1/1996 |
| JP | 8-285119 A | 11/1996 |
| JP | H09-303219 A | 11/1997 |
| JP | 10-122064 A | 5/1998 |
| JP | 2000-345927 A | 12/2000 |
| JP | 2001-140705 A | 5/2001 |
| JP | 2005-248911 A | 9/2005 |
| JP | 2008-307915 A | 12/2008 |
| JP | 2009-121353 A | 6/2009 |
| WO | 2008/099628 A1 | 8/2008 |

OTHER PUBLICATIONS

JP Office Acton dated Nov. 19, 2013 in the Japanese Application 2010-035137.

\* cited by examiner

OPENING ANGLE a = 0°

0 < a < Bmax (a ⊂ B): CLOSE-HOLD · STANDBY

0 < a = Bmax (a ⊂ B): CLOSE-HOLD · STANDBY

Bmax < a (a ⊄ B)

Bmax < a = 90° (a ⊄ B)

IN FUELING

FIG. 7     IN CS-MODE TRAVELING (PURGING)

EVAPORATED FUEL TREATMENT APPARATUS AND METHOD OF DETECTING FAILURE IN CONTROL VALVE

CROSS REFERENCE TO RELATED APPLICATION

This application claims the foreign priority benefit under Title 35, United States Code, §119(a)-(d) of Japanese Patent Applications No. 2010-035088, No. 2010-035136, and No. 2010-035137, filed on Feb. 19, 2010 in the Japan Patent Office, the disclosures of which are herein incorporated by reference in their entirety.

BACKGROUND OF THE INVENTION

1. Field of the Invention

The present invention relates to an evaporated fuel treatment apparatus which has a canister for adsorbing an evaporated fuel produced in a fuel tank and which treats the evaporated fuel and relates to a control method for a control valve provided at a communication path (a vapor path) between the fuel tank and the canister of the evaporated fuel treatment apparatus, and more particularly, relates to a method of detecting a failure in the control valve.

2. Description of the Related Art

Conventional evaporated fuel treatment apparatuses cause a canister to adsorb an evaporated fuel in order to reduce the pressure in a fuel tank, thereby preventing the evaporated fuel produced in the fuel tank from being released to the atmosphere at the time of fuel charging (see, for example, JP 2001-140705A).

JP 2001-140705A discloses an evaporated gas suppressing apparatus which has a control valve provided at a communication path between a fuel tank of a vehicle such as an automobile and a canister for adsorbing an evaporated fuel (a vapor) produced in the fuel tank, opens the control valve in a condition in which the pressure inside the fuel tank becomes higher than a predetermined pressure in a status of fueling and while the vehicle is running, and closes the control valve while the vehicle is at rest.

According to the conventional evaporated fuel treatment apparatuses, the control valve is provided at a vapor path between the fuel tank and the canister, the control valve is opened prior to fuel charging in order to allow the canister to adsorb the evaporated fuel in the fuel tank through the control valve, thereby reducing the pressure inside the fuel tank. Reduction of the pressure prevents the evaporated fuel from being released to the atmosphere during fueling.

According to the conventional evaporated fuel treatment apparatuses, the canister becomes able to adsorb the evaporated fuel upon opening of the control valve. When a driver opens a filler cap after the pressure difference between the pressure inside the fuel tank and the atmospheric pressure becomes equal to or smaller than a predetermined pressure difference, it is possible to prevent the evaporated fuel from being released to the atmosphere. At this time, it is necessary for the driver to wait to open the filler cap until the pressure difference between the pressure inside the fuel tank and the atmospheric pressure becomes equal to or smaller than a predetermined pressure difference. It is desirable that the waiting time for opening the filler cap should be short to such an extent that the driver does not feel that the driver is forced to wait.

In the meantime, vehicles like plug-in hybrid vehicles that do not run an engine for a long time normally close the control valve so that the evaporated fuel from the fuel tank is not adsorbed by the canister. When the control valve is kept closed for a long time, the control valve may be seized because of a gum element produced when a resin part of the control valve is dissolved by a liquid.

Accordingly, an opening/closing operation of the control valve can be considered in the method disclosed in JP 2001-140705A in order to detect a seizing failure of the control valve. However, an opening/closing operation of the control valve causes the canister to adsorb the evaporated fuel, so that in the case of a vehicle which does not run the engine for a long time like a plug-in hybrid vehicle, such a vehicle needs a canister with a further large capacity.

SUMMARY OF THE INVENTION

The present invention may provide an evaporated fuel treatment apparatus which can shorten the waiting time until a driver, etc., becomes able to open the filler cap at the time of fueling.

The present invention may provide a method of detecting a failure in the control valve provided at a communication path between the fuel tank and the canister.

A first aspect of the present invention provides an evaporated fuel treatment apparatus comprising:

a canister configured to adsorb an evaporated fuel generated in a fuel tank; and a control valve, installed at a vapor path communicating with a fuel tank and a canister, configured to allow an evaporated fuel to flow therethrough, have a dead-zone range in an opening angle of a valve element where a flow of the evaporated fuel is blocked even when the opening angle of the control valve is increased in an open direction from the opening angle of zero that is a closed position of the control valve, and allow the evaporated fuel to flow therethrough when the opening angle of the control valve exceeds the dead-zone range; and a control unit configured to perform opening control on the control valve so as to cause the evaporated fuel to flow through the control valve, wherein the control unit increases the opening angle of the control valve from substantially zero to a predetermined opening angle in the dead-zone range and stands by prior to the opening control, and increases the opening angle of the control valve from the predetermined opening angle at the time of opening control or changes an opening speed of the control valve between a first range of the opening angle from substantially zero to the predetermined opening angle in the dead-zone range and a second range of the opening angle exceeding the predetermined opening angle.

According to this configuration, prior to the opening control on the control valve, the opening angle of the control valve is increased from substantially zero to the predetermined opening angle in the dead-zone range and this condition is maintained, so that at the time of opening control, an operation of increasing the opening angle from substantially zero to the predetermined opening angle in the dead-zone range can be omitted, and the opening angle can be increased from the predetermined opening angle. Accordingly, the pressure inside the fuel tank can be reduced rapidly, and a waiting time until a driver, etc., becomes able to open a filler cap at the time of fuel charging can be shortened.

Alternatively, by changing the open speed within a range from substantially zero to around the predetermined opening angle in the dead-zone range, the pressure inside the fuel tank can be reduced rapidly, and thus the waiting time until the driver, etc., becomes able to open the filler cap at the time of fuel charging can be shortened.

A second aspect of the present invention based on the first aspect provides the evaporated fuel treatment apparatus, wherein the predetermined opening angle is a substantially maximum opening angle in the dead-zone range.

According to this configuration, at the time of opening control, the opening angle increases from the substantially maximum opening angle in the dead-zone range through substantially no dead-zone range, so that the pressure inside the fuel tank can be reduced rapidly, and the waiting time until the driver, etc., becomes able to open the filler cap at the time of fuel charging can be shortened. The term substantially maximum opening angle means that such an opening angle has a margin around the maximum opening angle in consideration of a varying of an opening angle detecting unit (an encoder).

A third aspect of the present invention based on the first aspect provides the evaporated fuel treatment apparatus, wherein the predetermined opening angle is in the dead-zone range where the flow of the evaporated fuel is blocked even when the opening angle of the control valve is increased from the opening angle of zero at the closed position of the control valve to the open direction, and where the flow rate of the evaporated fuel becomes changeless relative to the opening angle of the control valve.

According to this configuration, the initial part of the dead-zone range is set to correspond to a fast open speed, and the remaining part of the dead-zone range and the following range are set to correspond to a normal control open speed which is reduced from the fast open speed, so that the control valve can be opened rapidly. Accordingly, the control valve can flow the evaporated fuel rapidly, so that the pressure inside the fuel tank can be reduced rapidly, and the waiting time can be shortened.

A fourth aspect of the present invention based on the first aspect provides the evaporated fuel treatment apparatus, wherein the control valve is a ball valve.

Because the ball valve has a dead-zone range relative to an opening angle thereof, and the dead-zone range is constant over time according to its structure.

A fifth aspect of the present invention provides a method of detecting a failure in a control valve for a vehicle included in the evaporated fuel treatment apparatus according to the first aspect, which further includes a rotation angle detecting unit that detects a rotation angle of the control valve, wherein the control unit generates and send to the control valve an output value as a target opening angle of the control valve, the method comprising of:

comparing the output value set in the dead-zone range with a detected value by the rotation angle detecting unit; and
determining a failure in the control valve on the basis of a result of comparing.

According to the present invention, it becomes possible to detect a seizing failure of the control valve.

DETAILED DESCRIPTION OF THE PREFERRED EMBODIMENTS

Figure 1:
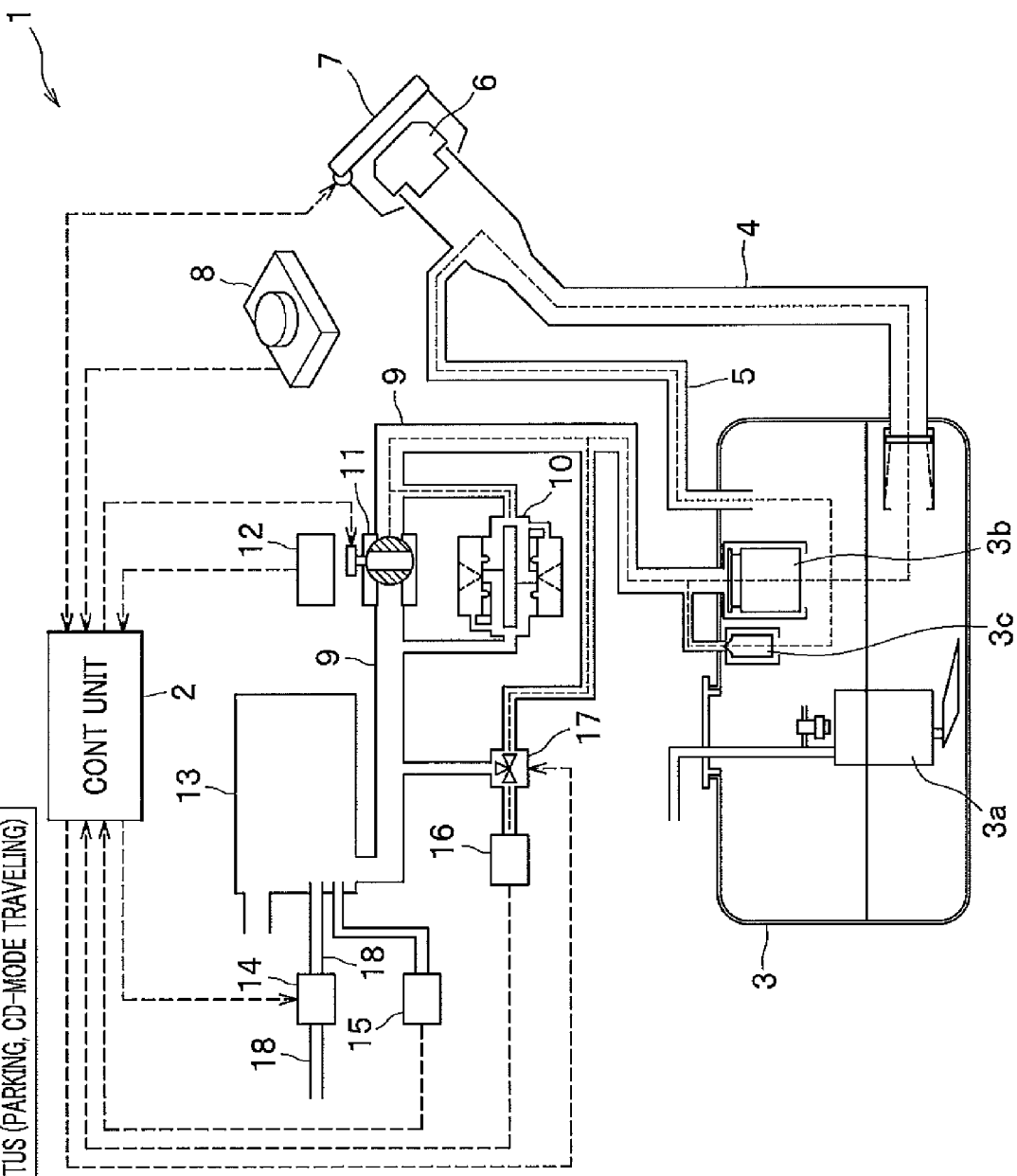
FIG. 1 is a diagram showing a configuration of an evaporated fuel treatment apparatus according to first to third embodiments of the present invention (at the time of maintaining a closed status)

Embodiments of the present invention will be explained in detail with reference to the accompanying drawings as needed. In each drawing, the same structural element will be denoted with the same reference numeral, and the duplicated explanation thereof will be omitted.

FIG. 1 is a diagram showing a configuration of an evaporated fuel treatment apparatus 1 (at the time of maintaining a closed status) according to first to third embodiments of the present invention. The evaporated fuel treatment apparatus 1 comprises a vapor path (a piping) 9, a control valve (a ball valve) 11 connected to the pipes in the vapor path 9, a high-pressure two-way valve 10 connected to pipes in the vapor path 9 in parallel with the control valve 11, an opening angle detecting unit (an encoder) 12 which detects a rotation angle (an open degree) of the control valve 11, a canister 13 to which one end of the vapor path 9 is connected, a purging path (a piping) 18 having one end connected to the canister 13 and having another end connected to an intake path (unillustrated) of an internal combustion engine, a purging control valve 14 connected to pipes of the purging path (the piping) 18, a pressure sensor 15 that detects a pressure inside the canister 13, a three-way valve 17, a pressure sensor 16 that detects a pressure at the side of a fuel tank 3 and a pressure at the canister-13 side relative to the control valve 11 in the vapor path 9 by changing the direction of the flow of gas by the three-way valve 17, and a control unit 2.

The vapor path 9 has another end connected to the fuel tank 3. A filler pipe 4 and a breather pipe 5 are connected to the fuel tank 3. The breather pipe 5 has another end connected to the upper part of the filler pipe 4. The filler pipe 4 has another end plugged off by a filler cap 6.

A fuel lid 7 further covers the filler cap 6. When a driver, etc., pushes a lid switch 8, and when the control unit 2 determines that a predetermined condition is satisfied, the control unit 2 opens the fuel lid 7. When the fuel lid 7 is opened, the driver, etc., can remove the filler cap 6, and a fuel charging to the fuel tank 3 is enabled.

The fuel tank 3 comprises a pump 3a that feeds a fuel to the internal combustion engine (unillustrated), a float valve 3b and a cut valve 3c both provided at an opening to the vapor path 9. The float valve 3b blocks off the opening to the vapor path 9 when the fuel tank 3 becomes full, thereby preventing the fuel from entering into the vapor path 9. The cut valve 3c does not block off the opening to the vapor path 9 when the fuel tank 3 becomes full, but for example, when the fuel tank 3 is tilted and the liquid level of the fuel ascends, the cut valve 3c prevents the fuel from entering into the vapor path 9.

The canister 13 is able to adsorb an evaporated fuel produced in the fuel tank 3 reserving the fuel. The canister 13 has an activated charcoal, etc., thereinside, which adsorbs the evaporated fuel. On the other hand, the canister 13 suctions air, and feeds the suctioned air to the purging path (the piping) 18, thereby purging the evaporated fuel adsorbed in the canister 13 to the internal combustion engine out of the canister 13.

The control valve 11 is provided at the vapor path 9 communicating the fuel tank 3 and the canister 13 with each other. An example of the control valve 11 is a ball valve. It will be explained in more detail later but a ball valve is fully closed when the opening angle thereof becomes zero, and is fully opened when the opening angle thereof becomes 90 degrees. The opening angle of the control valve (the ball valve) 11 can be detected by the opening angle detecting unit 12, and the detected opening angle is transmitted to the control unit 2. The control unit 2 can perform both opening control of opening the control valve 11 and closing control of closing the control valve 11.

The high-pressure two-way valve 10 is a mechanical valve that is a combination of diaphragm-type positive and negative pressure valves. The positive pressure valve is configured to be opened when the pressure at the fuel-tank-3 side becomes higher than the pressure at the canister-13 side by a predetermined pressure. Opening of this valve causes the high-pressure evaporated fuel in the fuel tank 3 to be fed to the canister 13. The negative pressure valve is configured to be opened when the pressure at the fuel-tank-3 side becomes lower than the pressure at the canister-13 side by a predetermined pressure. Opening of this valve causes the evaporated fuel retained in the canister 13 to be returned to the fuel tank 3.

Accordingly, when the fuel tank 3 maintained in a closed status at the time of "parking" and at the time of "CD MODE driving" excessively becomes a high pressure or a low pressure, the high-pressure two-way valve 10 is opened, thereby adjusting the internal pressure of the fuel tank 3.

The purging control valve 14 is provided at the purging path (the piping) 18. An example of the purging control valve 14 available is an electromagnetic valve. The purging control valve 14 is subjected to an opening control and a closing control by the control unit 2.

Examples of the pressure sensors 15, 16 are each a piezoelectric device. The pressure sensor 15 is connected to the canister 13, and is able to detect a pressure inside the canister 13. Because the pressure inside the canister 13 becomes equal to a pressure inside the purging path 18 and a pressure at the canister-13 side relative to the control valve 11 in the vapor path 9, the pressure sensor 15 can substantially detect those pressures. Detected pressure is transmitted to the control unit 2.

The pressure sensor 16 is connected to an opening of the three-way valve 17. The other two openings of the three-way valve 17 are connected to the canister-13 side of the vapor path 9 with respect to the control valve 11 and the fuel-tank-3 side of the vapor path 9 with respect to the control valve 11, respectively. The control unit 2 controls the three-way valve 17 in order to connect the pressure sensor 16 to the canister-13 side of the vapor path 9 with respect to the control valve 11, or connect the pressure sensor 16 to the fuel-tank-3 side of the vapor path 9 with respect to the control valve 11. When the pressure sensor 16 is connected to the canister-13 side of the vapor path 9 with respect to the control valve 11, the pressure sensor 16 can detect a pressure at the canister-13 side in the vapor path 9 with respect to the control valve 11, and also a pressure inside the canister 13. A pressure detected at this time is consistent with a pressure detected by the pressure sensor 15 when the same location is measured, so that the pressure sensors 15, 16 can be calibrated and a failure diagnosis can be enabled. When the three-way valve 17 is controlled and the pressure sensor 16 is connected to the fuel-tank-3 side of the vapor path 9 with respect to the control valve 11, the pressure sensor 16 can detect a pressure at the fuel-tank-3 side in the vapor path 9 with respect to the control valve 11, and also a pressure inside the fuel tank 3. The pressure sensor 16 transmits the detected pressure to the control unit 2.

Figure 2A:
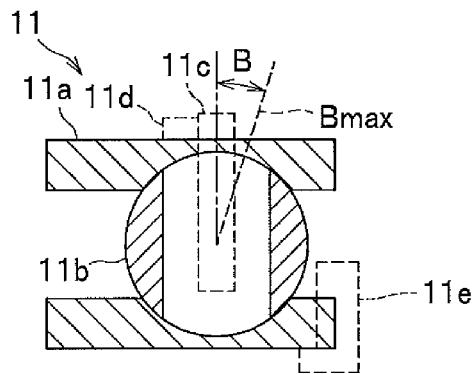
FIG. 2A is a cross-sectional view of cutting a ball (a valve element) of a control valve (a ball valve) used in the evaporated fuel treatment apparatus according to the first to third embodiments of the present invention with a plane having a normal line aligned with a rotation axis of the ball and shows a condition in which the opening angle (open degree) of the control valve is zero (fully closed)

FIGS. 2A to 2E are cross-sectional views of cutting a ball (a valve element) of the control valve (the ball valve) 11 with a plane having a normal line aligned with the rotation axis of the ball. FIG. 2A shows a status in which an opening angle a of the control valve 11 is zero (fully closed). When the opening angle a is zero (fully closed), with respect to the direction of the flow path in a valving seat 11a, the direction of the flow path in a ball 11b is inclined by 90 degrees, and the flow path in the valving seat 11a is blocked by the ball 11b. The valving seat 11a is provided with a fully closed stopper 11d and a fully opened stopper 11e, and the ball 11b is provided with a stem 11c. The stem 11c rotates together with a rotation of the ball 11b. When the opening angle a is zero (fully closed), the stem 11c abuts the fully closed stopper 11d, so that the ball 11b is prevented from rotating in the counterclockwise direction over the condition shown in FIG. 2A. The control unit 2 performs closing control of rotating the ball 11b and the stem 11c until those become unable to rotate in the counterclockwise direction, and stores an opening angle a in the unrotatable status as a zero angle (zero point), thereby enabling a zero point correction of the opening angle a. Also, in a status in which the opening angle a is 90 degrees (fully opened), the stem 11c abuts the fully open stopper 11e, so that the ball 11b becomes unable to rotate in the clockwise direction over the condition shown in FIG. 2E. FIGS. 2A to 2E show a status in which the ball 11b is rotated in the clockwise direction in order to open the valve, but the present invention is not limited to this condition, and the ball 11b may be rotated in the counterclockwise direction in order to open the valve. In this case, the position of the fully close stopper 11d and that of the fully open stopper 11e may be adjusted in accordance with a rotatable range of the ball 11b and that of the stem 11c.

The control valve (the ball valve) 11 has, in addition to the range where the opening angle is substantially zero and the control valve 11 is fully closed, a dead-zone range (invariable zone range) B where the opening angle is larger than substantial zero and the flow rate of the evaporated fuel becomes changeless relative to the opening angle. In the dead-zone range B, even if the opening angle of the control valve 11 is increased from the zero opening angle at the closed position to the open direction, the flow of the evaporated fuel is blocked. In the dead-zone range B, no evaporated fuel flows and no evaporated fuel is adsorbed in the canister 13. When the opening angle becomes larger than the dead-zone range B, the flow of the evaporated fuel is permitted.

Figure 2B:
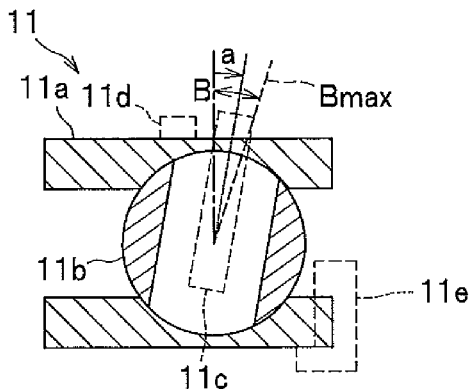
FIG. 2B is a cross-sectional view of cutting the ball of the control valve (the ball valve) used in the evaporated fuel treatment apparatus according to the first to third embodiments of the present invention with the plane having the normal line aligned with the rotation axis of the ball and shows a status in which the opening angle of the control valve is larger than zero but smaller than the maximum opening angle in a dead-zone range.

As shown in FIG. 2B, when the opening angle a is larger than zero but is smaller than a maximum opening angle Bmax in the dead-zone range B, like the case in which the opening angle a is zero, the flow path in the valve seat 11a is blocked by the ball (the valve element) 11b, so that the evaporated fuel cannot flow and pass through the control valve 11.

Figure 2C:
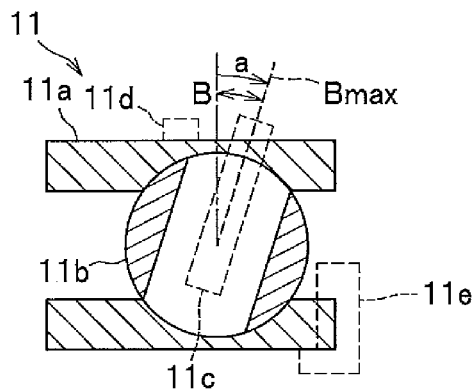
FIG. 2C is a cross-sectional view of cutting the ball of the control valve used in the evaporated fuel treatment apparatus according to the first to third embodiments of the present invention with the plane having the normal line aligned with the rotation axis of the ball and shows a status in which the opening angle of the control valve is equal to the maximum opening angle in the dead-zone range.

As shown in FIG. 2C, when the opening angle a is equal to the maxim opening angle Bmax of the dead-zone range B, the evaporated fuel cannot flow and pass through the control valve 11.

Figure 2D:
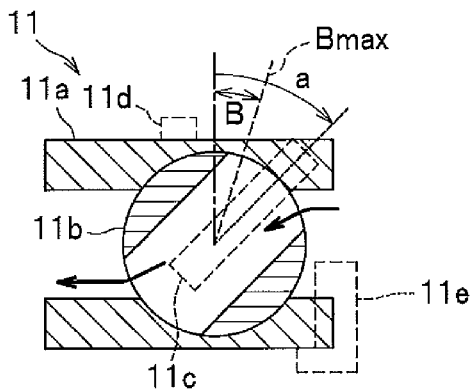
FIG. 2D is a cross-sectional view of cutting the ball of the control valve used in the evaporated fuel treatment apparatus according to the first to third embodiments of the present invention with the plane having the normal line aligned with the rotation axis of the ball and shows a status in which the opening angle of the control valve is larger than the maximum opening angle in the dead-zone range and is smaller than 90 degrees (fully opened)

As shown in FIG. 2D, when the opening angle a is larger than the maximum opening angle Bmax of the dead-zone range B but is smaller than 90 degrees (fully opened), the evaporated fuel can flow and pass through the control valve 11.

Figure 2E:
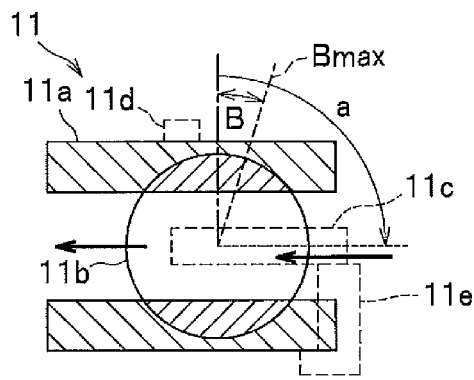
FIG. 2E is a cross-sectional view of cutting the ball of the control valve used in the evaporated fuel treatment apparatus according to the first to third embodiments of the present invention with the plane having the normal line that is the rotation axis of the ball and shows a status in which the opening angle of the control valve is equal to 90 degrees (fully opened)

As shown in FIG. 2E, when the opening angle a is equal to 90 degrees (fully opened), the direction of the flow path in the ball 11b matches the direction of the flow path in the valve seat 11a, so that the control valve 11 can allow the evaporated fuel to flow therethrough at a maximum flow rate.

Figure 3:
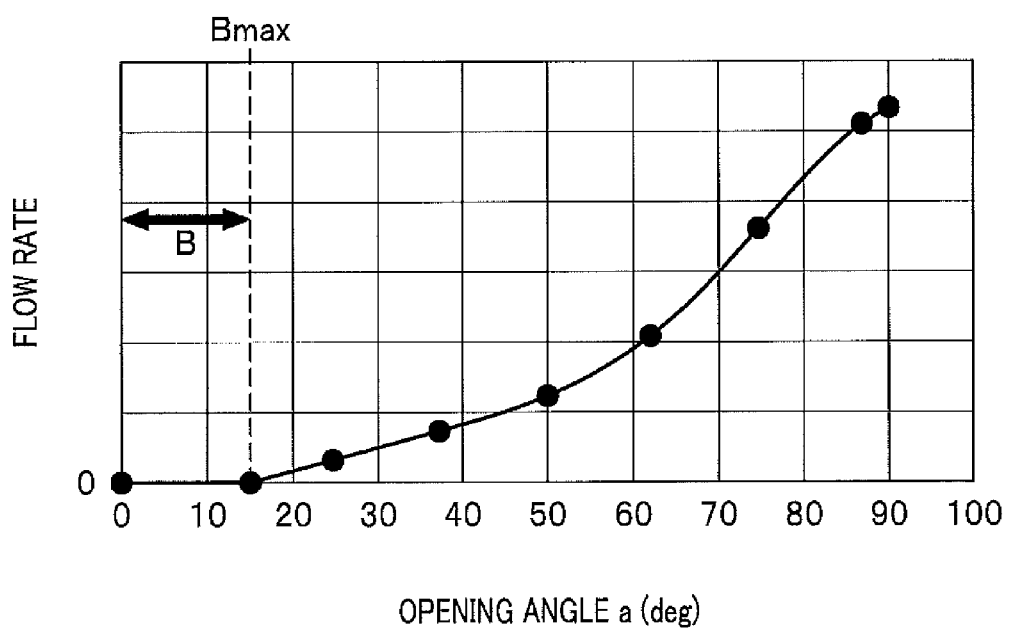
FIG. 3 is a graph showing a relationship between the opening angle of the control valve and the flow rate of the evaporated fuel flowing through the control valve.

FIG. 3 shows an example relationship between the opening angle a and the flow rate of the evaporated fuel through the control valve 11. When the opening angle a is zero, the flow rate is zero. When the opening angle a exceeds zero and is up to 15 degrees, the flow rate is still zero. The range where the flow rate is zero and the opening angle a exceeds zero and is up to 15 degrees is the dead-zone range B. The opening angle a which is 15 degrees is the maximum Bmax of the dead-zone range B. When the opening angle a exceeds the maximum Bmax that is 15 degrees, the flow rate becomes larger than zero, and up to 90 degrees, the larger the opening angle a becomes, the more the flow rate increases. The control unit 2 stores such a relationship of the flow rate relative to the opening angle a shown in the graph of FIG. 3, and in order to reduce the pressure inside the fuel tank 3 to a predetermined pressure within a predetermined time, calculates how much flow rate must be secured, and determines the opening angle a based on the calculated flow rate and the relationship of the flow rate relative to the stored opening angle a. Because the flow rate changes depending on the pressure difference between the upstream side of the control valve 11 and the downstream side thereof, such a pressure difference may be taken into consideration at the time of determination of the opening angle a.

First Embodiment

Figure 4:
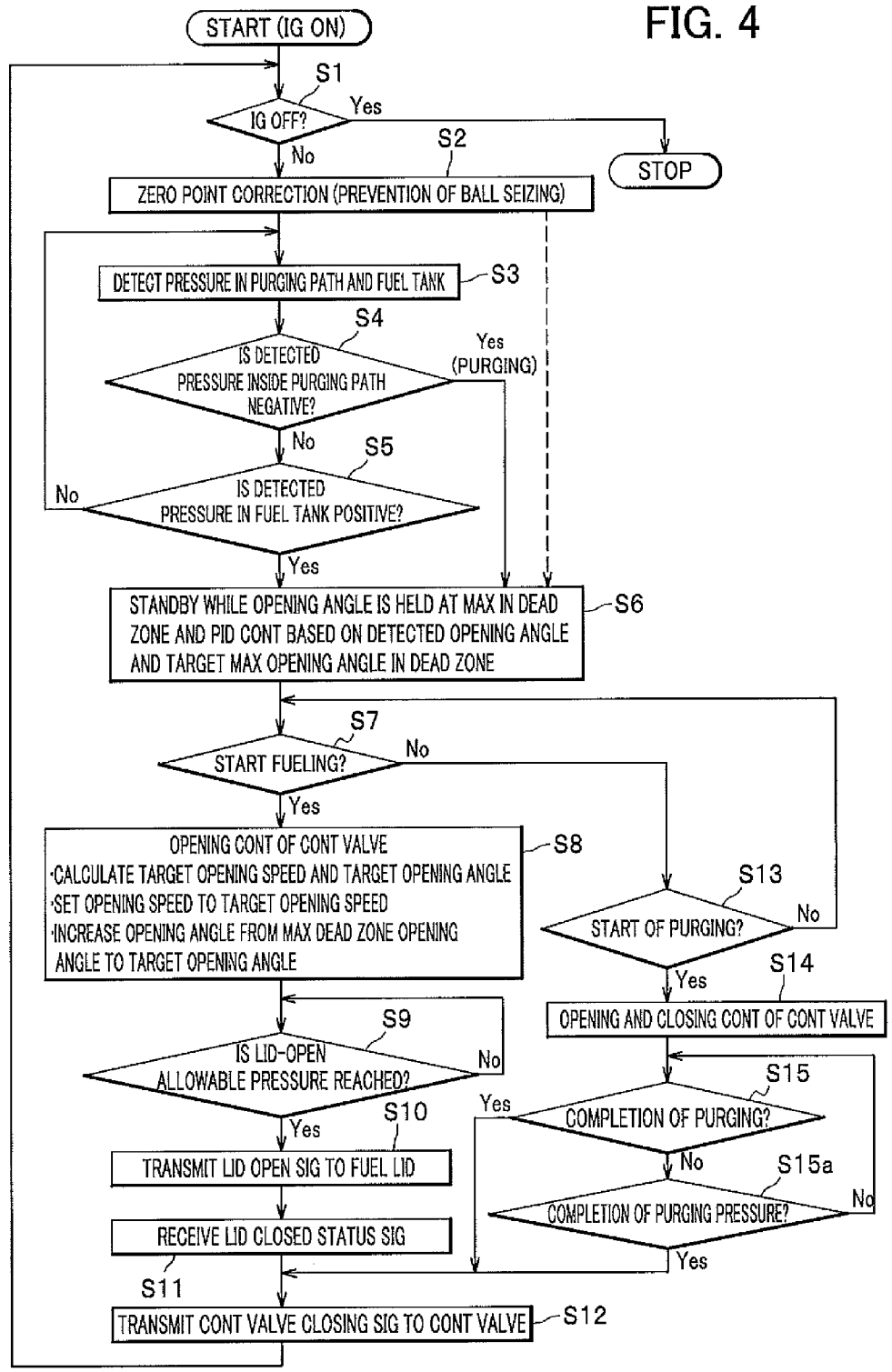
FIG. 4 is a flowchart of an evaporated fuel treating method executed by the evaporated fuel treatment apparatus according to the first embodiment of the present invention.

FIG. 4 shows a flowchart of an evaporated fuel treating method executed by the evaporated fuel treatment apparatus 1 according to the first embodiment of the present invention.

The control unit 2 starts (is activated) upon turning on of the IG (ignition) switch of the vehicle, etc., equipped with the evaporated fuel treatment apparatus 1.

The control unit 2 determines in step S1 whether or not the IG (ignition) switch is turned off. When the IG switch is turned off (step S1: YES), the flow of the process along this flowchart is terminated, and when the IG switch is not turned off (step S1: NO), the process progresses to step S3.

The control unit 2 executes zero point correction in step S2 in order to prevent the ball (the valve element) 11b from being seized. According to the zero point correction, the valve is closed until the stem 11c abuts the stopper 11d, etc., and the opening angle a at which the ball 11b is stopped is set as a zero point.

Figure 5:
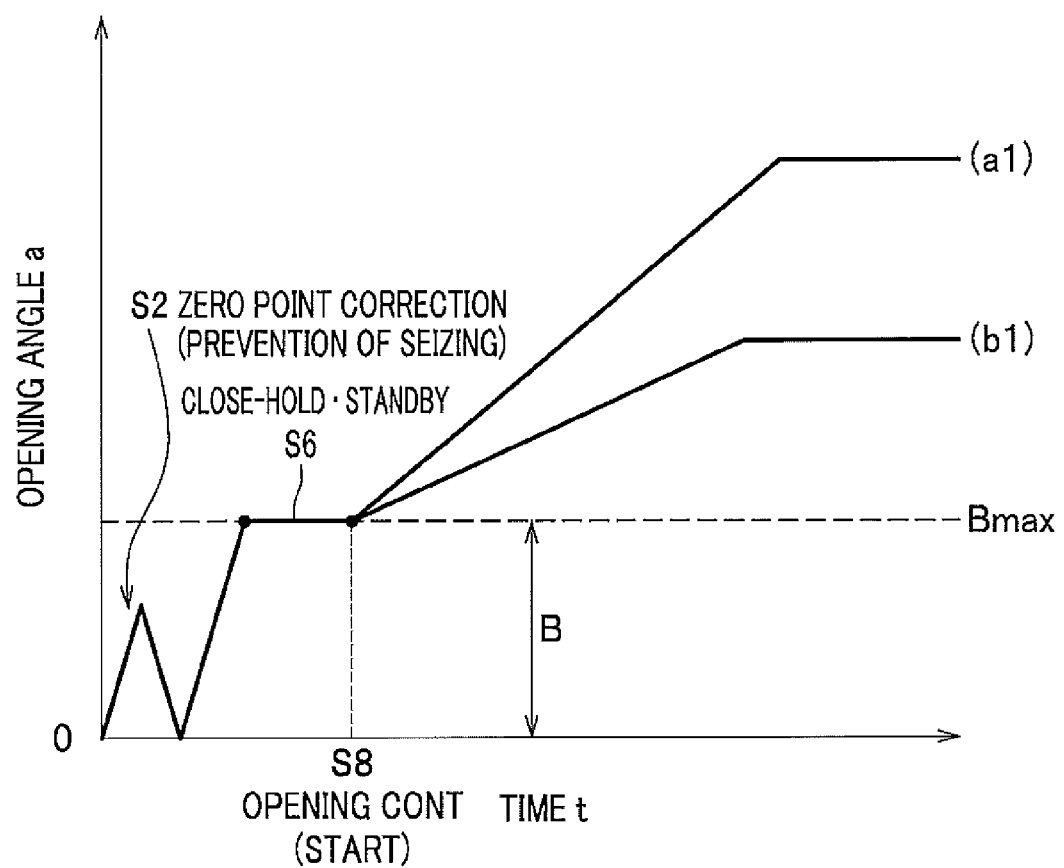
FIG. 5 is a graph showing the time dependency (a pattern a1 and a pattern b1) of the opening angle of the control valve in an opening control executed by the evaporated fuel treatment apparatus according to the first embodiment.

As shown in the initial of a time t shown in FIG. 5, prior to the zero point correction, the opening angle a is changed (the opening angle a is increased) within the dead-zone range B, and the zero point correction (the opening angle a is decreased) is performed. Because of the increasing and decreasing of the opening angle a, it becomes possible to prevent the ball (the valve element) 11b from being seized.

The control unit 2 obtains a pressure inside the purging path 18 detected by the pressure sensor 15 and obtains a pressure inside the fuel tank 3 detected by the pressure sensor 16 in the step S3.

The control unit 2 determines in step S4 whether or not the detected pressure inside the purging path 18 is a negative pressure. When such a detected pressure is a negative pressure (step S4: YES), the process progresses to step S6, and when such a detected pressure is not a negative pressure (step S4: NO), the process progresses to step S5.

As shown in FIG. 1, in general, the evaporated fuel treatment apparatus 1 is maintained in a closed condition. When the evaporated fuel treatment apparatus 1 is installed in the vehicle and such a vehicle is a plug-in hybrid vehicle, a closed status is maintained when the vehicle is parked and in a CD MODE driving (electric driving). When the closed status is maintained, the control valve 11 and the purging control valve 14 are both closed. Closing of the control valve 11 makes the interior of the fuel tank 3 kept in the closed condition. When the closed condition is maintained, because the purging control valve 14 is also closed, a detected pressure inside the purging path 18 at the canister-13 side with respect to the purging control valve 14 does not become a negative pressure.

Figure 7:
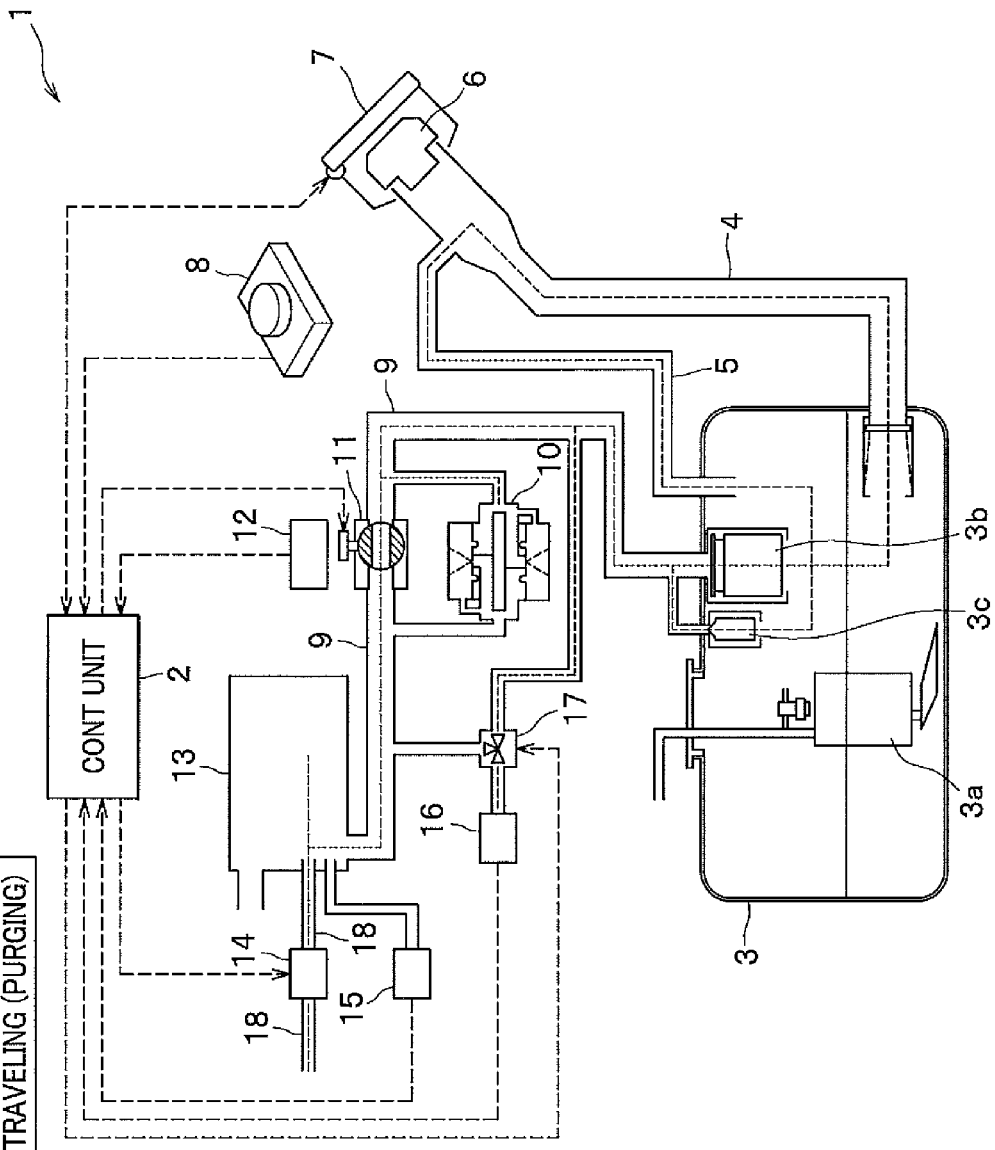
FIG. 7 is a diagram showing the configuration of the evaporated fuel treatment apparatus according to the first to third embodiments of the present invention and shows a status at the time of CS MODE driving (at the time of purging)

As shown in FIG. 7, when the evaporated fuel treatment apparatus 1 is installed in a plug-in hybrid vehicle, at the time of CS MODE driving, i.e., when the engine (ENG: internal combustion engine) is on during a hybrid (HEV) driving, a pressure inside the purging path 18 becomes a negative pressure. This is because the purging control valve 14 is opened together with the on-condition of the engine, and the intake path of the engine communicated with the purging path 18 becomes a negative pressure. The evaporated fuel adsorbed by the canister 13 is suctioned into the internal combustion engine through the purging path 18 and the intake path and is burned, i.e., is purged.

The control unit 2 determines in the step S5 whether or not the detected pressure inside the fuel tank 3 is equal to or larger than a positive pressure. When such a detected pressure is equal to or larger than a positive pressure (step S5: YES), the process progresses to the step S6, and when such a detected pressure is not equal to or larger than a positive pressure (step S5: NO), the process returns to the step S3. When the pressure inside the fuel tank 3 is equal to or larger than a positive pressure, it means that a time of fuel charging will come soon.

The steps from S3 to S5 can be omitted case by case, and when those steps are omitted, as is indicated by a dotted line, after the step S2 is executed, the process can progress to the step S6. Also depending on a situation, the step S2 can be omitted.

In the step S6, as shown in FIG. 5, the control unit 2 maintains the opening angle a of the control valve 11 to a predetermined opening angle larger than the zero point in the dead-zone range B, preferably, to the maximum (the maximum dead-zone opening angle) Bmax in the dead-zone range B and stands by. The predetermined opening angle is stored as a target opening angle or a target maximum dead-zone opening angle in the control unit 2 beforehand. When the control unit 2 performs the above maintaining and stand-by operations, a feedback control (PID: proportional plus integral plus derivative action control) is performed so that an opening angle detected by the opening angle detecting unit (the encoder) 12 matches the stored target opening angle or target maximum dead-zone opening angle.

The control unit 2 determines in step S7 whether or not the driver, etc., starts fueling (a fueling action). More specifically, the control unit 2 determines whether or not the lid switch 8 for opening/closing the fuel lid 7 is turned on by the driver, etc., and the control unit 2 receives an on-signal from the lid switch 8. When the control unit 2 receives the on-signal from the lid switch 8 and when it is determined that the driver, etc., starts charging a fuel (an action) (step S7: YES), the process progresses to step S8. When the control unit 2 receives no on-signal from the lid switch 8 and it is determined that the driver, etc., does not start fuelling (the fuelling action) (step S7: NO), the process progresses to step S13.

In the step S8, the control unit 2 executes the opening control on the control valve 11. The control unit 2 stores a relationship between the opening angle a and the flow rate relative to the opening angle a like the graph shown in FIG. 3, calculates how much volume of the evaporated fuel must be run in order to reduce the pressure inside the fuel tank 3 to be equal to or lower than a predetermined pressure within a predetermined time, e.g., a time which does not cause the driver, etc., to feel that such a time is long during fuel charging, and calculates and sets the opening angle a for each time that permits the calculated volume of evaporated fuel to flow within a predetermined period as a target opening angle speed and a target opening angle. As is indicated by a line a1 in FIG. 5, the opening angle a starts increasing from a certain condition regardless of the time of maintaining and stand-by operations. When the opening angle speed is set to be as a target opening angle speed, the opening angle a increases by this opening angle speed. The opening angle a increases to the target opening angle from a predetermined opening angle (preferably, the maximum dead-zone opening angle Bmax) at the time of maintaining and stand-by operations, and becomes constant regardless of a time. The control unit 2 performs a feedback control (a PID control) based on the opening angle detected by the opening angle detecting unit (the encoder) 12, the target opening angle speed, and the target opening angle. Also, as is indicated by a line b1 in FIG. 5, the target opening angle speed and the target opening angle can be reduced in comparison with the case of line a1. This is because the detected pressure inside the fuel tank 3 is high in comparison with the case of the line a1. When the pressure inside the fuel tank 3 is high, the target opening angle is set to be low so that the flow speed of the evaporated fuel does not become too fast, and thus the opening angle is narrowed down.

Prior to the opening control on the control valve 11 in the step S8, the opening angle a of the control valve 11 is increased to the predetermined opening angle in the dead-zone range B from substantially zero in the step S6 and is in a stand-by condition, so that at the time of opening control, the opening angle a can be increased from the predetermined opening angle without an operation of increasing the opening angle a from substantially zero to the predetermined opening angle in the dead-zone range B. Hence, as shown in FIG. 6, when a fuel is charged, the control valve 11 is rapidly opened, so that the pressure inside the fuel tank 3 can be reduced rapidly, and a waiting time until the driver, etc., becomes able to open the filler cap at the time of fuelling can be shortened.

The control unit 2 determines in step S9 whether or not the pressure inside the fuel tank 3 is reduced and reaches a pressure that allows the lid to be opened. When the pressure reaches the lid-open allowable pressure (step S9: YES), the process progresses to step S10, and when the pressure does not reach the lid-open allowable pressure (step S9: NO), the process returns to the beginning of the step S9 and the step S9 is repeated.

Figure 6:
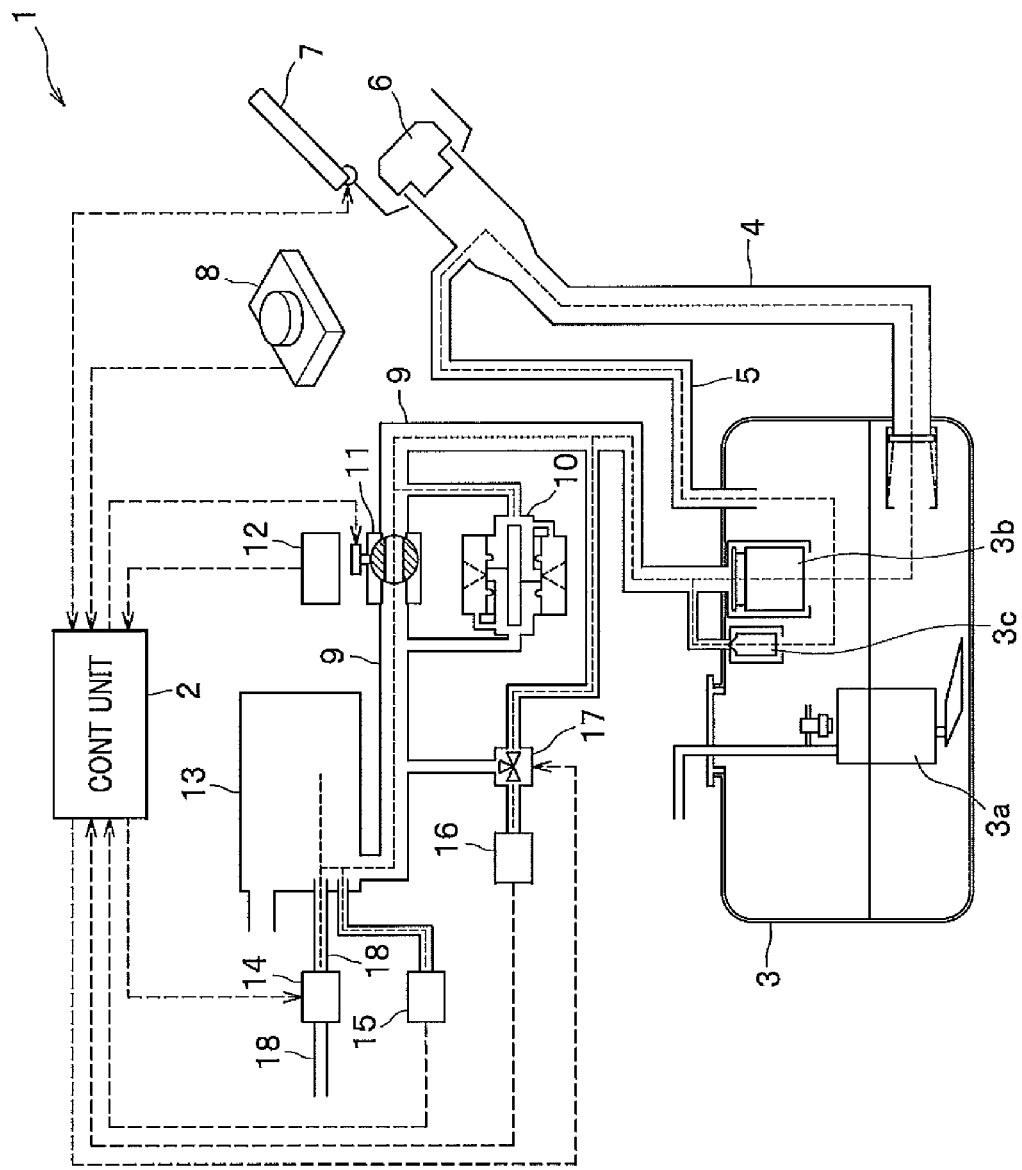
FIG. 6 is a diagram showing the configuration of the evaporated fuel treatment apparatus according to the first to third embodiments of the present invention, and shows a status at the time of fueling.

The control unit 2 transmits a lid open signal to the fuel lid 7 in step S10, and as shown in FIG. 6, opens the fuel lid 7. The driver, etc., opens the filler cap 6, and charges a fuel. After the fuel charging, the driver, etc., closes the filler cap 6, and further closes the fuel lid 7. By closing the fuel lid 7, the fuel lid 7 transmits a lid closed status signal.

The control unit 2 receives the lid closed status signal in step S11. Reception of the lid closed status signal indicates that the fuel charging by the driver, etc., completes, and the process progresses to step S12.

The control unit 2 transmits a control valve closing signal to the control valve 11 in order to perform closing control on the control valve 11 that closes the control valve 11 in step S12. Thereafter, the process returns to the step S1. Through the above-explained steps, the control unit 2 determines that the fuel charging completes.

The control unit 2 determines in step S13 whether or not to start purging that releases the pressure inside the fuel tank 3. More specifically, the control unit 2 is to receive, as a purging instruction signal (an instruction value), an on-condition signal that is output by the engine, etc., when the engine is in an on-condition, and an open condition signal that is output by the purging control valve 14 when the purging control valve 14 is opened, so that the control unit 2 determines whether or not receiving the purging instruction signal (the instruction value). Also, the control unit 2 can calculate a purging flow rate of the evaporated fuel 13 flowing through the purging path (the piping) 18 originating from the canister 13 based on an elapsed time after the purging control valve 14 is opened and a change in the pressure inside the canister 13 which is measured by the pressure sensor 15. Also, the control unit 2 can calculate a purging flow rate of the evaporated fuel flowing through the vapor path 9 originating from the fuel tank 3 based on a change in the pressure inside the fuel tank 3 measured by the pressure tank 16. At the time of purging, it is desirable that the evaporated fuel from the fuel tank 3 should not be trapped in the canister 13, and should be burned by the engine through the purging path (the piping) 18. Accordingly, at the time of purging, the purging flow rate of the evaporated fuel flowing through the purging path (the piping) 18 where the evaporated fuels from the fuel tank 3 and the canister 13 merge is set to be larger than the purging flow rate of the evaporated fuel flowing through the vapor path 9 originating from the fuel tank 3. In order to establish such a setting, it is appropriate if the purging flow rate of the evaporated fuel from the canister 13 is equal to or larger than a predetermined value before purging that releases the pressure inside the fuel tank 3 is started. Hence, based on whether or not the purging flow rate of the evaporated fuel from the canister 13 is equal to or larger than a predetermined value, the control unit 2 determines whether or not to start purging that releases the pressure inside the fuel tank 3. When the control unit 2 determines to start purging based on a reception of the purging instruction signal (instruction value) and on the condition in which the purging flow rate of the evaporated fuel from the canister 13 is equal to or larger than the predetermined value (step S13: YES), the process progresses to step S14. When the control unit 2 determines not to start purging that releases the pressure inside the fuel tank 3 based on a non-reception of a purging instruction signal (the instruction value) and on the condition in which the purging flow rate of the evaporated fuel from the canister 13 is not equal to or larger than the predetermined value (step S13: NO), the process returns to the step S7.

In the step S14, like the step S8, the control unit 2 performs opening control (opening/closing control) on the control valve 11. The control unit 2 stores a relationship of the flow rate relative to the opening angle a like the graph shown in FIG. 3 beforehand, calculates how much volume of the evaporated fuel must be caused to flow in order to reduce the pressure inside the fuel tank 3 within a predetermined time, e.g., a time that can ensure the purging flow rate of the evaporated fuel from the canister 13 to be equal to or larger than a predetermined value, and calculates and sets the opening angle a for each time that can allow a calculated volume to be run within a predetermined period as the target opening angle speed and the target opening angle.

Prior to the opening/closing control on the control valve 11 in the step S14, the opening angle a of the control valve 11 is increased in the step S6 to the predetermined opening angle in the dead-zone range B from substantially zero and this status is maintained, so that at the time of opening/closing control, an operation of increasing the opening angle a from substantially zero to the predetermined opening angle in the dead-zone range B can be omitted, and the opening angle a can be initially increased from the predetermined opening angle.

Accordingly, prior to the opening control, the control unit 2 increases the opening angle from substantially zero to the predetermined opening angle in the dead-zone range and stands by, and at the time of opening control, increases the opening angle from the predetermined opening angle or changes the open speed within a range from substantially zero to around the predetermined opening angle in the dead-zone range.

As shown in FIG. 7, because at the time of CS MODE driving (at the time of purging), the control valve 11 can be rapidly opened, the evaporated fuel in the fuel tank 3 is also rapidly suctioned into the internal combustion engine through the vapor path 9, the control valve 11, the canister 13, the purging path 18, and the intake path, and thus so-called purging is rapidly performed. Also, because when the evaporated fuel in the fuel tank 3 has been rapidly purged and the pressure inside the fuel tank 3 has been sufficiently reduced, the pressure inside the fuel tank 3 at the time of fuel charging has been also reduced beforehand. This allows a low amount of reduction. According to such a low reduction amount, the pressure inside the fuel tank 3 can be rapidly reduced, and a waiting time until the driver, etc., becomes able to open the filler cap 6 at the time of fuel charging can be shortened.

The control unit 2 determines in step S15 whether or not the purging completes. When the purging flow rate of a gas flowing through the purging path becomes equal to or smaller than a predetermined rate, it is determined that the purging ends (step S15: YES), and then the process progresses to the step S12. When the purging flow rate of the gas flowing through the purging path is not equal to or smaller than the predetermined rate, it is determined that the purging does not end yet (step S15: NO), and thus the process progresses to step S15a. The control unit 2 determines in the step S15a whether or not purging-pressure release completes. When the purging flow rate of the gas flowing through the purging path becomes equal to or smaller than a predetermined rate and the purging-pressure release ends (step S15a: YES), the process progresses to the step S12, and when the purging flow rate of the gas flowing through the purging path is not equal to or smaller than the predetermined rate and the purging-pressure release does not end yet (step S15a: NO), the process returns to step S15. When the engine stops, because the negative pressure inside the purging path 18 is no longer maintained, the control unit 2 determines that the purging completes in order to finish purging. When the process progresses from the step S15 (S15a) to the step S12 (purging), in addition to the closing control on the control valve 11, the control unit 2 may send a purging valve close signal to the purging control valve 14, and the purging control valve 14 may be closed. Through the foregoing processes, the control unit 2 determines that the purging fully completes.

Second Embodiment

Figure 8:
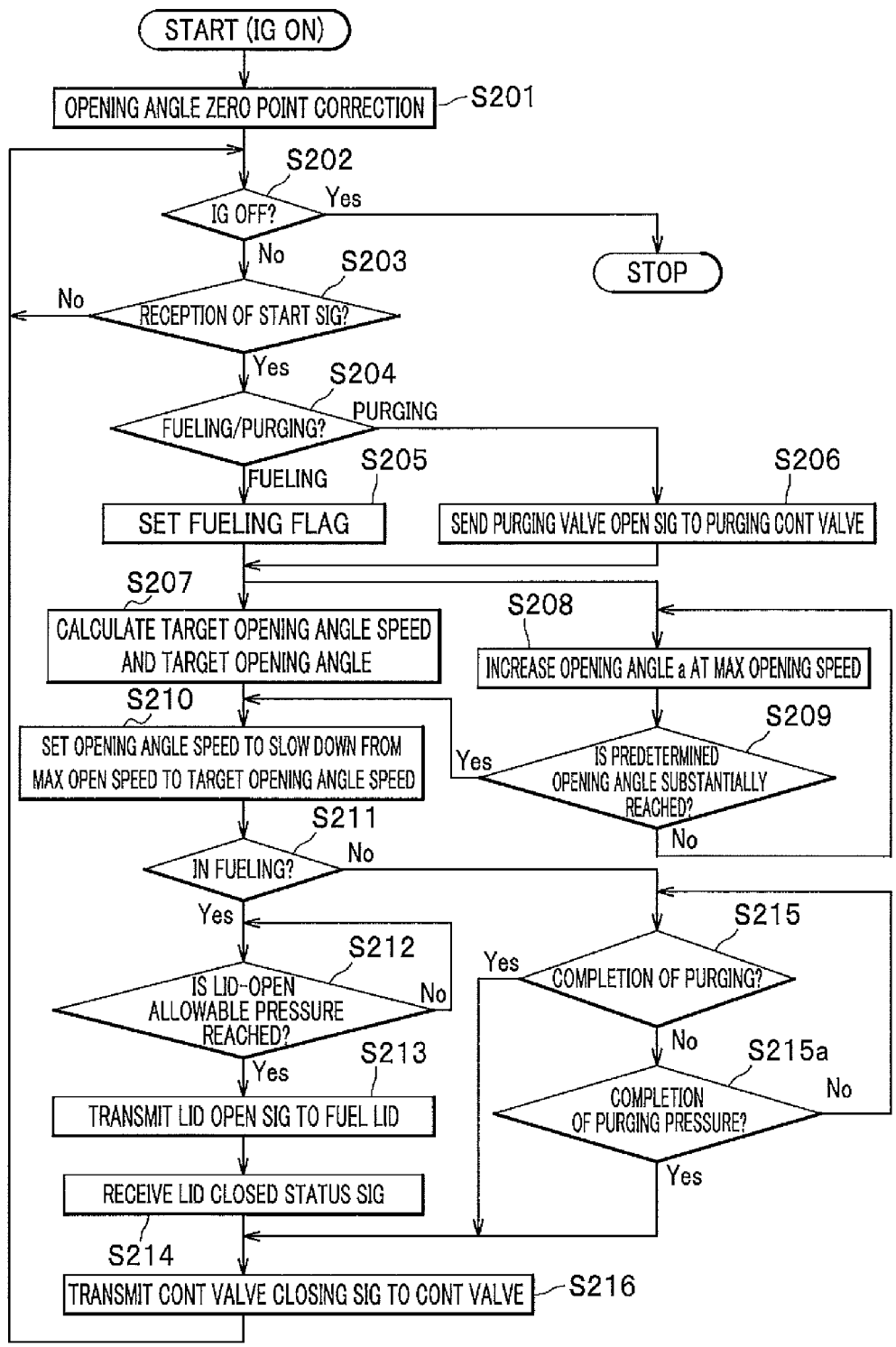
FIG. 8 is a flowchart of an evaporated fuel treating method executed by the evaporated fuel treatment apparatus according to the second embodiment of the present invention.

FIG. 8 shows a flowchart of an evaporated fuel treating method executed by an evaporated fuel treatment apparatus 1 according to a second embodiment.

The control unit 2 is started (activated) upon turning on of the IG (ignition) switch of the vehicle, etc. equipped with the evaporated fuel treatment apparatus 1.

In step S201, the control unit 2 executes zero point correction which is also for preventing the ball (the valve element) 11b from being seized. According to the zero point correction, the valve is closed until the stem 11c abuts the stopper 11d, etc., and the opening angle a at which the ball 11b is stopped is set as the zero point. The opening angle a is changed within the dead-zone range B (the opening angle a is increased), and then the zero point correction (the opening angle a is decreased) is performed. The increase and decrease of the opening angle a prevents the ball (the valve element) 11b from being seized.

The control unit 2 determines in step S202 whether or not the IG (ignition) switch is turned off. When the IG switch is turned off (step S202: YES), the process along this flowchart is stopped, and when the IG switch is not turned off (step S202: NO), the process progresses to step S203.

The control unit 2 determines in the step S203 whether or not a start signal for the opening control on the control valve 11 is received and obtained. When the start signal is received (step S203: YES), the process progresses to step S204, and when the start signal is not received (step S203: NO), the process returns to the step S202. When the driver, etc., operates the lid switch 8 in order to open/close the fuel lid 7 at the time of fuel charging, an on-signal is used as the start signal. At the time of purging, an activation signal for activating the engine (the internal combustion engine) is used. In the case of a vehicle using only the engine as a driving source, turning on of the IG switch generates the activation signal, but in the case of a plug-in hybrid vehicle, because there may be a case where a source of driving the vehicle may be changed from only the motor to the motor plus the engine during traveling, the start signal may be generated during traveling.

The control unit 2 determines in the step S204 whether the state is in fuel charging or in purging. Determination is made based on the start signal received and obtained in the step S203. When it is in fuel charging (step S204: FUEL CHARGING), the process progresses to step S205, and when it is in purging (step S204: PURGING), the process progresses to step S206.

The control unit 2 sets an in-fueling flag in the step S205 in order to store a state indicating that it is in fuel charging.

The control unit 2 sends a purging valve open signal to the purging control valve 14 in the step S206 in order to open the purging control valve 14.

As shown in FIG. 1, the evaporated fuel treatment apparatus 1 is normally maintained in the closed condition. When the evaporated fuel treatment apparatus 1 is loaded in a vehicle which is a plug-in hybrid vehicle, the closed condition is maintained at the time of vehicle being parked and at the time of CD MODE driving. The control valve 11 and the purging control valve 14 are both closed in the closed condition. Closing of the control valve 11 maintains the interior of the fuel tank 3 to be closed. Closing of the purging control valve 14 maintains the interior of the canister 13 to be closed.

As shown in FIG. 7, when the evaporated fuel treatment apparatus 1 is loaded in a plug-in hybrid vehicle, at the time of CS MODE driving, i.e., when in hybrid (HEV) driving and when the engine (ENG: the internal combustion engine) is on, a state becomes a purging state which allows the engine to burn the evaporated fuel and so-called purging of the evaporated fuel is enabled. At the time of purging while the engine is on, the intake path of the engine becomes a negative pressure. Because the purging path 18 is connected to the intake path of the engine, the pressure inside the purging path 18 also becomes a negative pressure. When the purging control valve 14 is opened together with an engine on state, the evaporated fuel adsorbed in the canister 13 is suctioned into the engine through the purging path 18 and the intake path and is burned, thereby so-called purging is performed.

In step S207, prior to the opening control on the control valve 11, the control unit 2 calculates a target opening angle speed and a target opening angle. The control unit 2 stores a relationship of the flow rate relative to the opening angle a as shown by the graph in FIG. 3 beforehand, calculates how much volume of the evaporated fuel must be run in order to reduce the pressure inside the fuel tank 3 to be equal to or lower than a predetermined pressure within a predetermined time, i.e., a time which does not cause the driver, etc., to feel long at the time of fuel charging and which enables the driver, etc., to wait, and sets the opening angle a for each time at which the calculated volume of evaporated fuel can flow within a predetermined time period in the forms of the target opening angle speed and the target opening angle.

It is preferable that the process at step S208 should be executed during the calculation at the step S207. In order to execute the process at the step S210, it is necessary that the processes at the step S207 and at the step S208 must be completed, and when the requisite time for the step S208 is longer than that of the step S207, the step S208 may be started simultaneously with the start of the step S204, i.e., right after the YES determination at the step S203.

Figure 9:
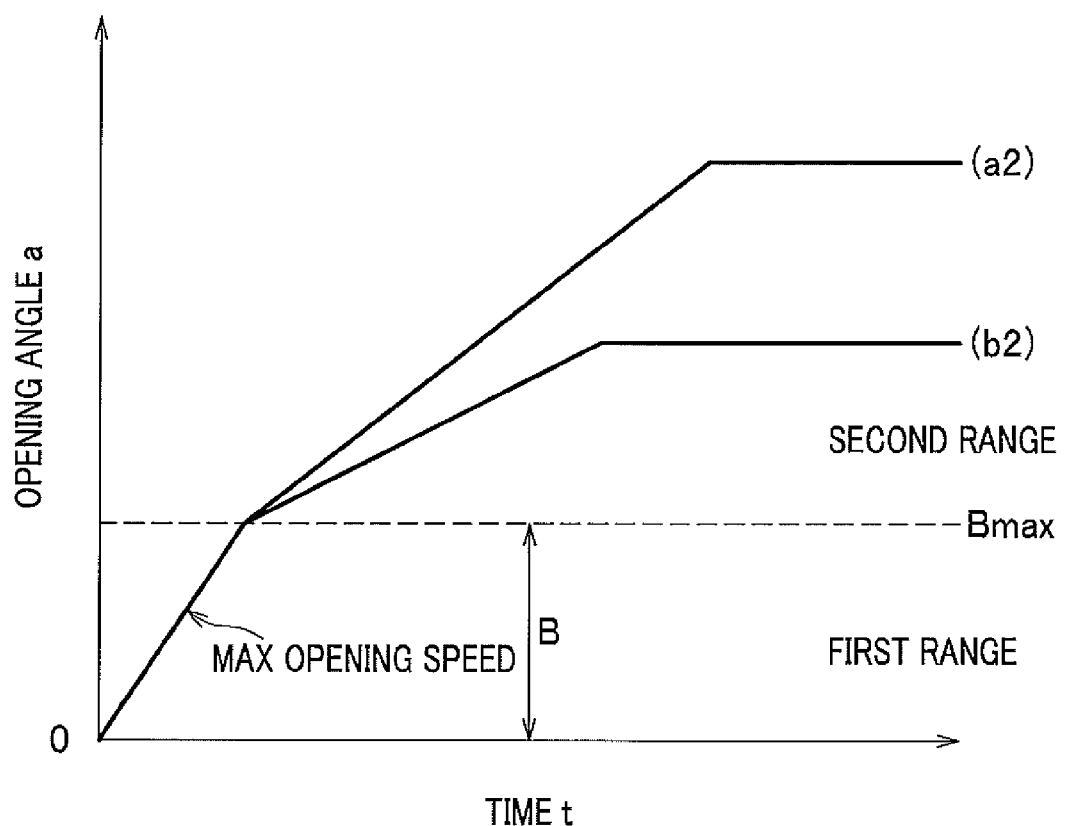
FIG. 9 is a graph showing the time dependency (a pattern a2 and a pattern b2) of the control valve at the time of opening control executed by the evaporated fuel treating method according to the second embodiment of the present invention.

In the step S208, the control unit 2 increases, as shown in FIG. 9, the opening angle a at the maximum opening angle speed (open speed).

The control unit 2 determines in step S209 whether or not the opening angle a substantially reaches the maximum (the maximum dead-zone opening angle) Bmax in the dead-zone range B which is stored beforehand as the predetermined opening angle. When the opening angle a substantially reaches such a maximum (step S209: YES), the process progresses to step S210, and when the opening angle a has not reached such a maximum (step S209: NO), the process returns to the step S208. As shown in FIG. 9, because the opening angle a reaches the maximum dead-zone opening angle Bmax at the maximum opening angle speed (the open speed), the opening angle a reaches the maximum dead-zone opening angle Bmax at the shortest time.

In the step S210, the control unit 2 sets the opening angle speed to slow down from the maximum opening angle speed (the open speed) to the target opening angle speed calculated in the step S207 as is indicated by a line a2 in FIG. 9, thereby performing speed control (opening control). The opening angle a increases to the target opening angle calculated in the step S207 from the predetermined opening angle (preferably, the maximum dead-zone opening angle Bmax), and becomes constant regardless of a time. The control unit 2 performs feedback control (PID control) based on the opening angle detected by the opening angle detecting unit (the encoder) 12, the target opening angle speed, and the target opening angle. Also, as is indicated by a line b2 in FIG. 9, the target opening angle speed and the target opening angle can be smaller than that in the case of the line a2. This is because the detected pressure inside the fuel tank 3 is high in comparison with the case of the line a2. When the pressure inside the fuel tank 3 is high, the target opening angle is set to be low so that the flow speed of the evaporated fuel does not become too fast, and thus the opening angle is decreased. Through the opening control in the step S210, the opening angle a exceeds the maximum dead-zone opening angle Bmax, the control valve 11 is opened, and the evaporated fuel starts flowing through the control valve 11.

Prior to the opening control on the control valve in the step S210, in the step S208, the opening angle a of the control valve 11 is increased to the maximum dead-zone opening angle Bmax at the maximum opening angle speed (the open speed), i.e., in the shortest time, so that when it is in a fuel charging as shown in FIG. 6, the control valve 11 rapidly opens, the pressure inside the fuel tank 3 is reduced rapidly, and thus the waiting time until the driver, etc., becomes able to open the filler cap 6 at the time of fuel charging can be shortened. Also, at the time of opening control in the step S210, the operation of increasing the opening angle a from substantially zero to the maximum dead-zone opening angle Bmax can be omitted but the opening angle a can be increased from the maximum dead-zone opening angle Bmax, so that the waiting time can be further shortened.

Also, as shown in FIG. 7, even in the CS MODE driving (purging), the control valve 11 can be rapidly opened, the evaporated fuel in the fuel tank 3 can be rapidly suctioned and burned in the internal combustion engine through the vapor path 9, the control valve 11, the canister 13, the purging path 18, and the intake path, and thus so-called purging is rapidly carried out. Also, when the evaporated fuel in the fuel tank 3 is rapidly purged and the pressure inside the fuel tank 3 has been reduced sufficiently, the pressure inside the fuel tank 3 at the time of fuel charging has been also reduced beforehand, so that a little amount of reduction is sufficient. The waiting time until the driver, etc., becomes able to open the filler cap 6 at the time of fuel charging can be shortened by such a reduction amount, so that the pressure inside the fuel tank 3 can be reduced rapidly.

The control unit 2 determines in step S211 whether or not it is in fuel charging. In this case, however, when the control unit 2 determines that it is not in fuel charging, this automatically means that it is in a purging situation. The determination is made based on the presence/absence of the fueling flag set in the step S205. When it is in fuel charging (step S211: YES), the process progresses to step S212, and when it is not in fuel charging (if in purging, step S211: NO), the process progresses to step S215.

The control unit 2 determines in the step S212 whether or not the pressure inside the fuel tank 3 is reduced and reaches a pressure that allows opening of the lid. When the pressure reaches the lid-open-allowable pressure (step S212: YES), the process progresses to step S213, and when the pressure has not reached the lid-open-allowable pressure (step S212: NO), the process returns to the beginning of the step S212, and the step S212 is repeated. Because the pressure inside the fuel tank 3 is rapidly reduced through the step S208, etc., the pressure inside the fuel tank 3 can reach the lid-open-allowable pressure within a short time.

The control unit 2 sends a lid open signal to the fuel lid 7 in the step S213, and as shown in FIG. 6, the fuel lid 7 is opened. The driver, etc., opens the filler cap 6, and charges fuel. After the fuel charging, the driver, etc., closes the filler cap 6, and further closes the fuel lid 7. Closing of the fuel lid 7 causes the fuel lid 7 to send a lid closed signal.

The control unit 2 receives the lid closed signal in step S214. When the control unit 2 receives the lid closed signal, this means that the fuel charging by the driver, etc., completes, and the process progresses to step S216.

In the step S216, the control unit 2 sends a control valve close signal to the control valve 11, and performs closing control on the control valve 11 to close it. Thereafter, the process returns to the step S202. Through the foregoing process, the control unit 2 determines that fuel charging fully completes.

In the step S215, the control unit 2 determines whether or not purging is completed. When the purging flow rate of the gas flowing through the purging path becomes equal to or smaller than a predetermined rate and the purging ends (step S215: YES), the process progresses to step S216. When the purging flow rate flowing through the purging path is not equal to or smaller than the predetermined rate and the purging does not end yet (step S215: NO), the process progresses to step S215*a*. The control unit 2 determines in the step S215*a* whether or not purging-pressure release completes. When the purging flow rate flowing through the purging path becomes equal to or smaller than a predetermined rate and the purging-pressure release ends (step S215*a*: YES), the process progresses to step S216, and when the purging flow rate flowing through the purging path is not equal to or smaller than the predetermined rate and the purging-pressure release does not end yet (step S215*a*: NO), the process returns to the step S215. When the engine stops, the negative pressure inside the purging path 18 is no longer maintained, so that the control unit 2 determines that the purging completes in order to finish purging. When the process progresses from the step S215 (S215*a*) to the step S216 (purging), in addition to the closing control on the control valve 11, the control unit 2 may send a purging valve close signal to the purging control valve 14, and the purging control valve 14 may be closed. Through the foregoing processes, the control unit 2 determines that the purging fully completes.

As explained above, according to the second embodiment of the present invention, the evaporated fuel treatment apparatus 1 is provided which can change an opening speed (a/t) of the control valve between a first range of the opening angle from substantially zero to the predetermined opening angle in the dead-zone range and a second range of the opening angle exceeds the predetermined opening angle as shown in FIG. 9.

Third Embodiment

Next, an explanation will be given of a failure detecting method executed by an evaporated fuel treatment apparatus 1 according to a third embodiment of the present invention.

<<Control Valve Failure Detecting Control>>

Vehicles such as plug-in hybrid vehicles which do not run the engine for a long time do not have the "CS MODE driving" (purging) status (see FIG. 7) and do not become the "fuel charging" status (see FIG. 6) if the fuel is not consumed. Accordingly, the status in which the control valve 11 is closed for a long time (see FIG. 1) is maintained, and thus the control valve 11 may be seized in some cases.

When the control valve 11 is seized, it is difficult to run the large amount of evaporated fuel (vapor) to flow into the canister 13 at the time of fuel charging (see FIG. 6), so that the evaporated fuel may leak from the fuel lid 7, and it is desirable to perform failure detecting control for detecting the seizing failure of the control valve 11.

Also, if the engine is not run, the evaporated fuel adsorbed in the canister 13 is not purged into the intake path (unillustrated) in the internal combustion engine. Accordingly, when failure detecting control for detecting the seizing failure of the control valve 11 to be discussed later is executed, it is desirable to execute the failure detecting control in a state in which the vapor path 9 communicating the fuel tank 3 with the canister 13 is closed so that no evaporated fuel in the fuel tank 3 is adsorbed in the canister 13, i.e., in a status in which the control valve 11 closes the vapor path 9.

An explanation will now be given of the failure detecting control for detecting the seizing failure of the control valve 11 executed by the evaporated fuel treatment apparatus 1 of this embodiment with reference to FIG. 10.

Figure 10:
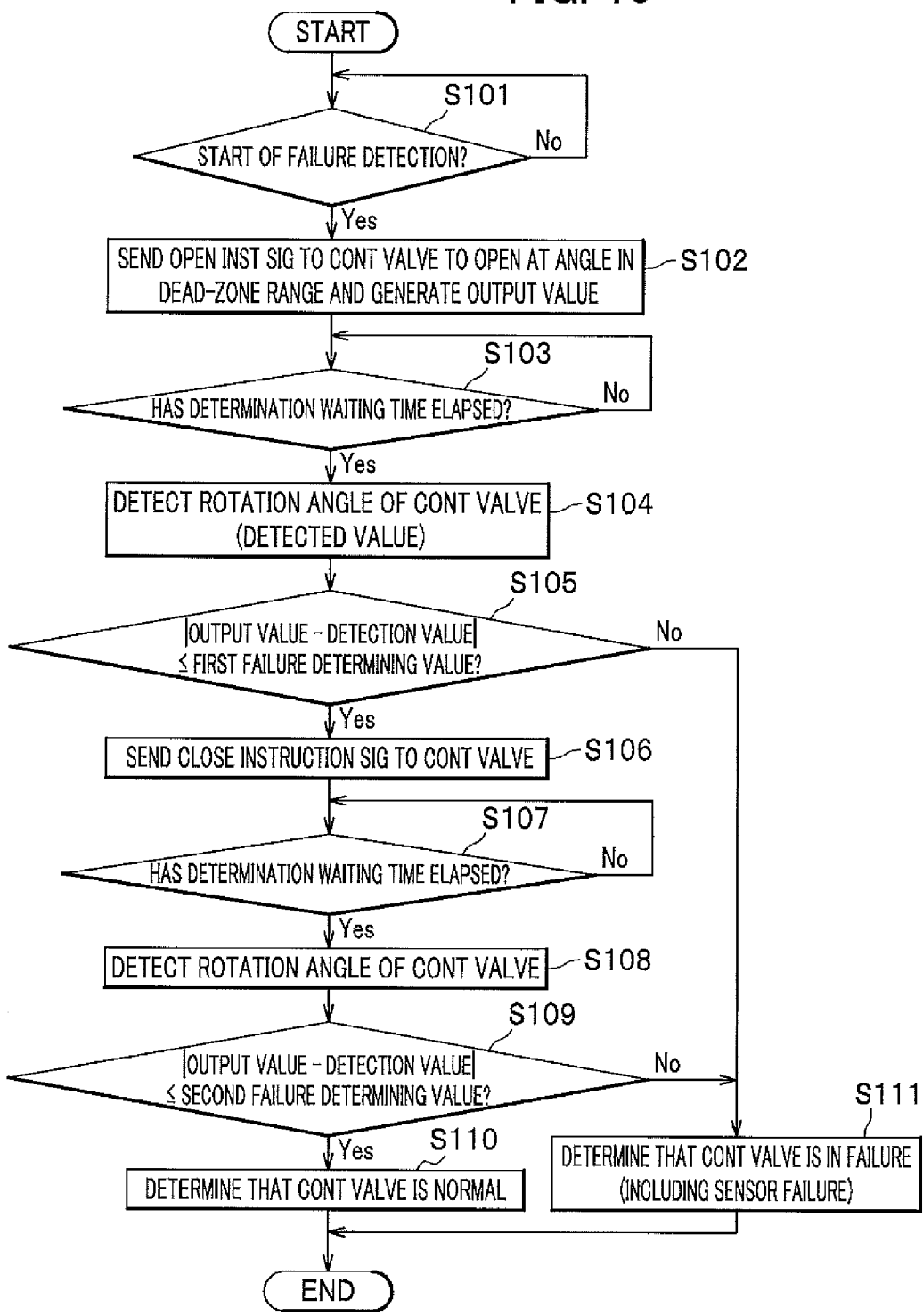
FIG. 10 is a flowchart showing a control-valve-failure detecting control by the evaporated fuel treatment apparatus according to the third embodiment of the present invention.

FIG. 10 is a flowchart showing the failure detecting control of the control valve 11 executed by the evaporated fuel treatment apparatus 1 according to this embodiment.

First, the control unit (an open/close instruction unit) 2 determines in step S101 whether or not it is in a condition to start the failure detecting control. When it is not in the condition to start the failure detecting control (step S101: NO), the step S101 is repeated until it becomes a condition to start the failure detecting control.

When it is in the condition to start the failure detecting control (step S101: YES), the process progresses to step S102.

The condition to start the failure detecting control may be a condition when the ignition switch of the vehicle is turned on, or may be a condition when the driving source (an engine or an EV) of the vehicle is activated. Also, a condition in which a predetermined time has elapsed after the previous operation of the control valve 11 may be the condition to start the failure detecting control. Furthermore, when the number of times that the ignition switch is turned on becomes a predetermined number, or when the travel distance of the vehicle becomes a predetermined value, the failure detecting control may be started.

In the step S102, the control unit (the open/close instruction unit) 2 sends an open instruction signal to the control valve 11 to open it at an angle within the dead-zone range B and generates an output value as a target opening angle.

A rotation angle set at the angle within the dead-zone range B and output by the control unit (the open/close instruction unit) 2 to the control valve 11 as the open instruction signal is referred to as an "output value".

In the step S103, the step S103 is repeated until a "determination waiting time" elapses. When the "determination waiting time" has elapsed, the process progresses to step S104.

The "determination waiting time" is a value set in consideration of a necessary time until the control valve 11 is rotated to the "output value" in the step S102.

In the step S104, the control unit 2 causes the opening angle sensor (a rotation angle detecting unit) 12 to detect the actual rotation angle of the control valve 11 in response to the open instruction given in the step S102, and receives a signal indicating a detected value.

The actual rotation angle of the control valve 11 detected by the opening angle sensor (the rotation angle detecting unit) 12 is referred to as a "detected value".

In step S105, the control unit 2 compares the "output value" output by the control unit (the open/close instruction unit) 2 in the step S102 with the "detected value" detected by the opening angle sensor (the rotation angle detecting unit) 12 in the step S104.

More specifically, it is determined whether the absolute value of a difference between the "output value" and the "detected value" is equal to or less than a "first failure determining value" or larger than the "first failure determining value".

When the absolute value of the difference between the "output value" and the "detected value" is equal to or less than the "first failure determining value" (step S105: YES), the process progresses to step S106. On the other hand, when the absolute value of the difference between the "output value" and the "detected value" is larger than the "first failure determining value" (step S105: NO), the process progresses to step S111.

The "first failure determining value" is set based on the allowable range of an error of the control valve 11 and that of the opening angle sensor (the rotation angle detecting unit) 12.

In the step S106, the control unit (the open/close instruction unit) 2 sends a close instruction signal to the control valve 11 in order to close it at an angle within the dead-zone range B.

In the step S107, until the "determination waiting time" has elapsed, the step S107 is repeated. When the "determination waiting time" has elapsed, the process goes to step S108.

The "determination waiting time" is a value set in consideration of a necessary time until the control valve 11 is rotated to the "output value" in the step S106. The "determination waiting time" in the step S108 and the "determination waiting time" in the step S103 may have the same set value, or may be different values.

In the step S108, the control unit 2 causes the opening angle sensor (the rotation angle detecting unit) 12 to detect the actual rotation angle of the control valve 11 in response to the close instruction given in the step S106, and receives a signal indicating a detected value.

In the step S109, the control unit 2 compares the "output value" output by the control unit (the open/close instruction unit) 2 in the step S106 with the "detected value" detected by the opening angle sensor (the rotation angle detecting unit) 12 in the step S108.

More specifically, it is determined whether the absolute value of a difference between the "output value" and the "detected value" is equal to or less than a "second failure determining value" or larger than the "second failure determining value".

When the absolute value of the difference between the "output value" and the "detected value" is equal to or less than the "second failure determining value" (step S109: YES), the process progresses to step S110. On the other hand, when the absolute value of the difference between the "output value" and the "detected value" is larger than the "second failure determining value" (step S109: NO), the process progresses to step S111.

Like the "first failure determining value", the "second failure determining value" is set based on the allowable range of an error of the control valve 11 and that of the opening angle sensor (the rotation angle detecting unit) 12. The second failure determining value may have the same set value as the "first failure determining value", or may be a different value.

The control unit 2 determines in the step S110 that the control valve 11 is in a normal condition and is not failure (there is no failure).

On the other hand, in the step S105 or the step S109, when the "output value" and the "detected value" are not consistent with each other (step S105: NO or step S109: NO), the control unit 2 determines that the control valve 11 is in an abnormal condition, and is failure.

As explained above, according to this embodiment, the control valve 11 is operated so as to rotate within the dead-zone range B thereof, so that seizing of the control valve 11 can be detected while the control valve 11 maintains a condition in which the vapor path 9 is closed and is not communicated between the fuel tank 3 and the canister 13, i.e., a condition in which the evaporated fuel in the fuel tank 3 is not adsorbed by the canister 13.

Also, even though the control valve 11 is not seized, when the response of the control valve 11 delays, the absolute value of the difference between the "output value" and the "detected value" after the determination waiting time has elapsed does not become equal to or smaller than the failure determining value, and the control unit 2 determines that the control valve 11 is in an abnormal condition (step S111), i.e., a condition in which the response of the control valve 11 becomes slow can be detected as an abnormal condition of the control valve 11.

In addition, even though the control valve 11 responds appropriately to the opening/closing instruction of the control unit 2, when there is an abnormality in the characteristic (including offsetting) of the opening angle sensor (the rotation angle detecting unit) 12, the absolute value of the difference between the "output value" and the "detected value" does not become equal to or smaller than the failure determining value, and the control unit 2 determines that the control valve 11 is in an abnormal condition (step S111), i.e., a condition in which the opening angle sensor (the rotation angle detecting unit) 12 is failure can be detected.

It is preferable that the vehicle performing the seizing detecting control explained in this embodiment should be a plug-in hybrid vehicle. According to the plug-in hybrid vehicle, traveling with the engine not being run for a long time is possible, so that the seizing detecting control on the control vale 11 is important. Hence, the seizing detecting control explained in this embodiment is preferable.

What is claimed is:

1. An evaporated fuel treatment apparatus comprising:
a canister configured to adsorb an evaporated fuel generated in a fuel tank; and
a control valve, installed at a vapor path communicating with a fuel tank and a canister, configured to allow an evaporated fuel to flow therethrough, have a dead-zone range in an opening angle of a valve element where a flow of the evaporated fuel is blocked even when the opening angle of the control valve is increased in an open direction from the opening angle of zero that is a closed position of the control valve, and allow the evaporated fuel to flow therethrough when the opening angle of the control valve exceeds the dead-zone range; and
a control unit configured to perform opening control on the control valve so as to cause the evaporated fuel to flow through the control valve,
wherein the control unit increases the opening angle of the control valve from substantially zero to a predetermined opening angle in the dead-zone range and stands by prior to the opening control, and increases the opening angle of the control valve from the predetermined opening angle at the time of opening control or changes an opening speed of the control valve between a first range of the opening angle from substantially zero to the predetermined opening angle in the dead-zone range and a second range of the opening angle exceeding the predetermined opening angle.

2. The evaporated fuel treatment apparatus according to claim 1, wherein the predetermined opening angle is a substantially maximum opening angle in the dead-zone range.

3. The evaporated fuel treatment apparatus according to claim 1, wherein the predetermined opening angle is in the dead-zone range where the flow of the evaporated fuel is blocked even when the opening angle of the control valve is increased from the opening angle of zero at the closed position of the control valve to the open direction, and where the flow rate of the evaporated fuel becomes changeless relative to the opening angle of the control valve.

4. The evaporated fuel treatment apparatus according to claim 1, wherein the control valve is a ball valve.

5. A method of detecting a failure in a control valve for a vehicle included in the evaporated fuel treatment apparatus according to claim 1, which further includes a rotation angle detecting unit that detects a rotation angle of the control valve, wherein the control unit generates and send to the control valve an output value as a target opening angle of the control valve, the method comprising of:

comparing the output value set in the dead-zone range with a detected value by the rotation angle detecting unit; and determining a failure in the control valve on the basis of a result of comparing.

* * * * *